United States Patent
White Bailey

(10) Patent No.: US 9,936,674 B1
(45) Date of Patent: Apr. 10, 2018

(54) PET ESSENTIALS BAG WITH CONVERTIBLE HOLDER AND BOWL SYSTEMS

(71) Applicant: Jo-Marie White Bailey, Chicago, IL (US)

(72) Inventor: Jo-Marie White Bailey, Chicago, IL (US)

(*) Notice: Subject to any disclaimer, the term of this patent is extended or adjusted under 35 U.S.C. 154(b) by 132 days.

(21) Appl. No.: 14/719,317

(22) Filed: May 22, 2015

Related U.S. Application Data

(60) Provisional application No. 62/002,119, filed on May 22, 2014.

(51) Int. Cl.
| | |
|---|---|
| *A01K 5/00* | (2006.01) |
| *A01K 5/01* | (2006.01) |
| *A01K 7/00* | (2006.01) |
| *A01K 29/00* | (2006.01) |
| *A45C 11/20* | (2006.01) |
| *A45C 13/02* | (2006.01) |
| *A45C 13/10* | (2006.01) |
| *A45C 13/26* | (2006.01) |
| *A45C 13/30* | (2006.01) |

(52) U.S. Cl.
CPC ............ *A01K 5/0114* (2013.01); *A01K 7/005* (2013.01); *A01K 29/00* (2013.01); *A45C 11/20* (2013.01); *A45C 13/02* (2013.01); *A45C 13/103* (2013.01); *A45C 13/1076* (2013.01); *A45C 13/26* (2013.01); *A45C 13/30* (2013.01); *A45C 2200/10* (2013.01); *A45C 2200/20* (2013.01)

(58) Field of Classification Search
CPC ........... A01K 5/0114; A01K 7/00; A01K 5/00
USPC ............... 119/51.5, 61.56; 220/23.87, 23.88, 220/23.83, 23.86, 23.89, 523; 206/223, 206/547
See application file for complete search history.

(56) References Cited

U.S. PATENT DOCUMENTS

| | | | | |
|---|---|---|---|---|
| 4,890,741 A | * | 1/1990 | Edelstein | A45C 11/24 206/232 |
| 5,265,719 A | * | 11/1993 | Wand | A45C 3/00 190/109 |
| 5,615,765 A | * | 4/1997 | Roericht | A45C 11/04 206/45.23 |
| 5,752,464 A | * | 5/1998 | King | A01K 5/0114 119/51.5 |
| 5,823,136 A | | 10/1998 | Zarski | |
| 5,871,280 A | * | 2/1999 | Watters | A01K 5/0114 206/216 |
| 6,568,347 B2 | | 5/2003 | Ciguere | |
| 7,263,949 B1 | | 9/2007 | Seaford | |
| 2003/0019434 A1 | * | 1/2003 | Spires | A01K 1/0353 119/28.5 |
| 2006/0207514 A1 | * | 9/2006 | Logan | A01K 5/0114 119/61.56 |

(Continued)

*Primary Examiner* — Trinh T Nguyen
(74) *Attorney, Agent, or Firm* — RG Patent Consulting, LLC; Rachel Gilboy

(57) ABSTRACT

A portable storage case or "lunch bag" configured expressly for pet use, with the device configured to hold a water bottle, food and water dish, pet treats or food, waste bags, and medication for the pet to provide caring pet owners a practical, comfortable and efficient means of quenching their animal's thirst and providing them with a hearty snack when engaged in a walk or otherwise on the go away from home.

17 Claims, 5 Drawing Sheets

(56) References Cited

U.S. PATENT DOCUMENTS

2006/0278169 A1\* 12/2006 Logan ...................... A01K 7/00
119/61.56

\* cited by examiner

PET ESSENTIALS BAG WITH CONVERTIBLE HOLDER AND BOWL SYSTEMS

CROSS-REFERENCE TO RELATED APPLICATION

The present application is related to and claims priority from prior provisional application Ser. No. 62/002,119, filed May 22, 2014 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of animal food and water containers and more specifically relates to a portable storage case or "lunch bag" configured expressly for pet use.

2. Description of the Related Art

Currently there are approximately 60 million owned dogs in the United States. Perhaps nothing is more enjoyable for dogs than going on a brisk walk with their owners. Whether sniffing in all the interesting smells of the outside, running into fellow canine friends, or simply feeling the sun on their bodies, walking for dogs provides them with amusement, exercise, and energy release. Jogging along with their owner or running freely through a park often results in dogs becoming very thirsty, especially on hot days. To avoid dehydration, dogs require plenty of water, as much if not more so than humans. Since it is often not practical to take a pet's water bowl along while out walking, pet owners are often faced with the daunting task of finding a convenient method of supplying their dog with fresh water when engaged in a walk, jog or even when spending time away from home.

Often times, one will attempt to pour some water from their own water bottle into their hand in attempts to create a makeshift bowl out of which the dog can drink, or attempt to provide the animal water directly from the water bottle itself. Awkward solutions at best, pouring water into the hand often results in the majority of the water spilling to the ground below, hardly quenching an animal's thirst, while pouring water directly into an animal's mouth forces them to tilt their head at an awkward and uncomfortable angle that can prevent them from comfortably consuming the water. Looking to satisfy its thirst, a dog will drink out of virtually any available water source regardless of whether it is sanitary or not. As can be imagined, attempting to prevent a thirsty animal from drinking from a dirty mud puddle or other suspect water source can be a challenge for dog owners, particularly as most are especially concerned with the safety and health of their pet. A solution is desirable.

Various attempts have been made to solve problems found in animal food and water containers art. Among these are found in: U.S. Pat. No. 5,823,136 to John A. Zarski; U.S. Pat. No. 7,263,949 to Kevin Seaford; and U.S. Pat. No. 6,568,347 to Angela Ciguere. This prior art is representative of combined animal food and water containers which can be easily carried when traveling. None of the above inventions and patents, taken either singly or in combination, is seen to describe the invention as claimed.

Ideally, a pet essentials bag with convertible holder and bowl system should provide a pet owner with a carrying bag comprising a water bottle holder that may convert into a water retaining bowl and a food retaining bowl, and, yet would operate reliably and be manufactured at a modest expense. Thus, a need exists for a reliable pet essentials bag with convertible holder and bowl system to avoid the above-mentioned problems.

BRIEF SUMMARY OF THE INVENTION

In view of the foregoing disadvantages inherent in the known pet supplies holder and bowl art, the present invention provides a novel pet essentials bag with convertible holder and bowl system. The general purpose of the present invention, which will be described subsequently in greater detail is to provide a portable storage case or "lunch bag" configured expressly for pet use, configured to hold a water bottle, food and water dish, pet treats or food, waste bags, and medication for the pet.

A preferred embodiment of the pet essentials bag with convertible holder and bowl system is disclosed herein essentially comprising a bag assembly. The bag assembly may comprise a portable enclosure, a convertible container, and a user-holder. The portable enclosure may comprise a front wall, a rear wall, a first sidewall, a second sidewall, a top, a top closure (comprising a flap closure), a bottom, and at least one side-compartment.

The convertible container may a first-compartment comprising a nonskid base, a second-compartment comprising the nonskid base, and a snap-fit closure for coupling and uncoupling the first-compartment and second-compartment together. It should be noted that convertible container may act as an insulator to a water bottle containable within.

The user-holder may comprise a shoulder strap useful for carrying the portable enclosure via a shoulder of a user. Further, the shoulder strap may comprise a length-adjuster for adjusting a length of the shoulder strap. The bag assembly may comprise the pet essentials bag with convertible holder and bowl system. The portable enclosure, the convertible container, and the user-holder may comprise in functional combination the bag assembly.

With reference to the portable enclosure; the front wall, the rear wall, the first sidewall, the second sidewall, the top, and the bottom, define the portable enclosure. The portable enclosure comprises an inner volume. The top closure may be structured to provide an unlockable closing between the top and the front wall of the portable enclosure for providing user access to the inner volume. The at least one side-compartment may be mountable adjacent the first sidewall, and the at least one side-compartment may be mountable adjacent the second sidewall.

The convertible container may comprise a hexagonal-cylindrical profile. The hexagonal cylindrical profile may be bifurcated into two halves; the two halves comprising the first-compartment and the second-compartment respectively. The portable enclosure may further comprise an identification tag; the identification tag comprising a transparent window for displaying identification information pertaining to a pet of the user.

Further, the portable enclosure may further comprise an inner pocket useful for retaining a plurality of pet accessories. The at least one side-compartment and the inner pocket of the portable enclosure may further comprise a snap-fastener. A front surface of the front wall of the portable enclosure may comprise a display window; the display window useful for portraying a displayable.

The first-compartment and the second-compartment may be removably-connectible via the snap-fit closure, the snap-fit closure enabling the first-compartment and the second-compartment to be coupled and uncoupled. The convertible container may comprise a hollow confine structured and arranged to retain at least one water bottle when the convertible container is in a closed condition. The first-compartment may comprise a first-bowl when the convertible container is in an open condition. The second-compartment may comprise a second-bowl when the convertible container is in the open condition. The user-holder may be removably-attachable to the portable enclosure. The user-holder may be structured and arranged for enabling the user to carry the bag assembly, and the pet essentials bag with convertible holder and bowl system may be useful for providing a compact carrier for carrying pet essentials, such as pet food and water, and for serving the pet food and the water in the first-compartment and the second-compartment of the convertible container respectively.

It should be noted that the pet essentials bag with convertible holder and bowl system may comprise a kit. The kit may comprise the bag assembly (comprising the portable enclosure, the convertible container, and the user-holder), the at least one water bottle, and a set of user instructions.

A method of using a pet essentials bag with convertible holder and bowl system may comprise the steps of: storing a plurality of pet accessories inside a portable enclosure of a bag assembly, locking at least one side-compartment of the portable enclosure during transport of the bag assembly, unlocking the at least one side-compartment of the portable enclosure during an 'in-use' condition, opening a convertible container retaining at least one water bottle, and filling a first-compartment and a second compartment with water and food for a pet to drink and eat out of.

The present invention holds significant improvements and serves as the pet essentials bag with convertible holder and bowl. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, a pet essentials bag with convertible holder and bowl system, constructed and operative according to the teachings of the present invention.

The various embodiments of the present invention will hereinafter be described in conjunction with the appended drawings, wherein like designations denote like elements.

DETAILED DESCRIPTION

Figure 1:
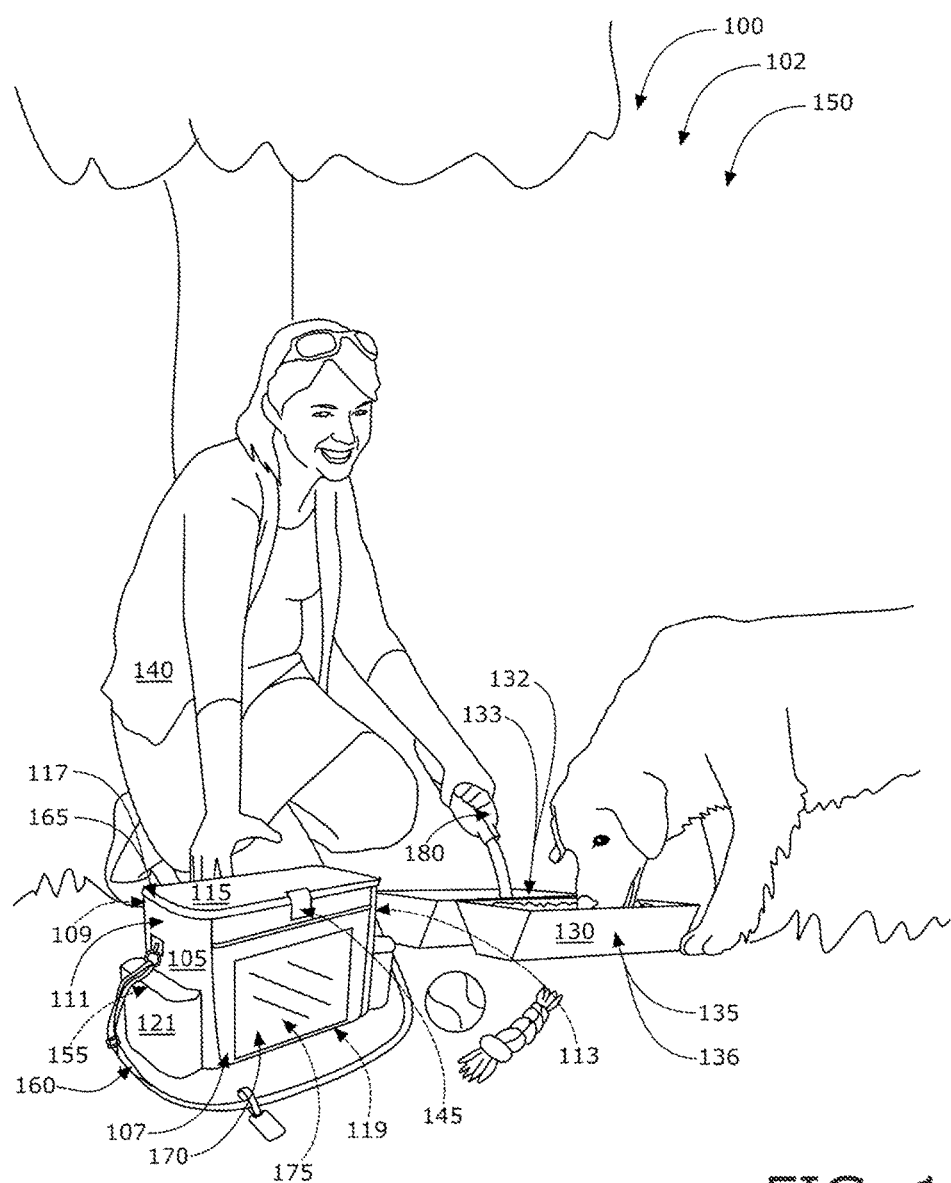
FIG. 1 shows a perspective view illustrating the pet essentials bag with convertible holder and bowl system during an 'in-use' condition according to an embodiment of the present invention.

As discussed above, embodiments of the present invention relate to a pet essentials bag with convertible holder and bowl and more particularly to a portable storage case or "lunch bag" configured expressly for pet use, with the device configured to hold a water bottle, food and water dish, pet treats or food, waste bags, and medication for the pet to provide caring pet owners a practical, comfortable and efficient means of quenching their animal's thirst and providing them with a hearty snack when engaged in a walk or otherwise on the go away from home.

Generally speaking, the pet essentials bag with convertible holder and bowl system (also referred to as "My Pet's Lunch Bag") may comprise a specially designed carrying case or "lunch bag" that provides all of the amenities necessary to comfortably supply an animal water when on the go. As an added design feature, this carryall may comprise integrated pockets for storing dog treats, snacks or other pet care items.

My Pet's Lunch Bag may comprise a bag itself, as well as a set of feeding and watering dishes and water bottle. The carryall bag may be manufactured from a variety of materials, such as canvas, nylon or comparable washable fabrics, and may be generally oval in shape. This unique bag may measure a compact 8½ inches in length by 3½ inches in width and 2½ inches in total depth. In such a manner, the water bottle and feeding dishes contained within would be sized accordingly. In addition, variously sized bags may be produced to accommodate breeds of all sizes.

A fully adjustable strap may be secured to either end of the top of the bag for use in easily carrying the unit by hand or over the shoulder. A simple flap closure may encompass the top of the bag and would be secured closed by way of a durable zipper. The front of the bag may be emblazoned with the image of a dog drinking out of the My Pet's Lunch Bag's dish.

My Pet's Lunch Bag may further comprise an attached tag with a clear viewing window inside of which the pet's name may be written. In this manner, name tags may be easily changed if necessary. Further, located on the sides of the bag would be sturdy zippered storage pockets inside of which waste collection bags, treats, or other objects may be neatly stored and easily accessed. An inner pocket may also be included for use in storing pet medications.

Importantly, housed within the bag may comprise the water bottle and pet feeding/watering dishes. The water bottle itself may be a cylindrical-shaped lidded receptacle structured to retain 16 ounces of water. Most notably, fitted over this water bottle may be a set of specially designed feeding and watering dishes, with these dishes molded to the shape of the bottle itself (though featuring a flat bottom), thus taking up minimal space when stored. These dishes may be positioned around the bottle, configured as a snap fitted casing to fit around the bottle encompassing it completely. Furthermore, comprising ample, cylindrical wells to be filled with water or snack treats (both dishes can be used for water if necessary), these dishes may be manufactured of a rigid plastic or comparable material and may advantageously comprise a flat, nonskid base to secure the relative position of the dishes during use. My Pet's Lunch Bag may initially comprise colors such as hues of black, brown, red or navy blue, though many various colors and patterns may also be produced.

My Pet's Lunch Bag may provide a convenient means of providing water and other necessities to pets in a pet friendly manner while on walks or on the go. A strategically designed carryall featuring a full size water bottle and two feeding dishes, My Pet's Lunch Bag may provide pet owners a simple means of caring for their dog's most basic needs when out and about. Quenching an active animal's thirst with hydrating water, My Pet's Lunch Bag may prevent possible dehydration on hot and dry days. A practical alternative to pouring water directly into the hand in order to present it to a dog; forcing the dog to awkwardly tilt their head in order to drink directly from a water bottle; or worse, allowing the animal to drink from a dirty water puddle, My Pet's Lunch Bag may provide an ample, sanitary receptacle from which the animal can comfortably drink. My Pet's Lunch Bag may provide a sensible means of caring for a dog's health when engaged in walks or other outdoor activities. A lightweight carryall inside of which the various pet care items could be neatly stored, My Pet's Lunch Bag may be easily transported. Not just for use on daily pet walks, My Pet's Lunch Bag may be an ideal accessory when pets accompany their owners on road trips, vacations or while camping or hiking.

Referring now to the drawings by numerals of reference there is shown in FIG. 1, pet essentials bag with convertible holder and bowl system 100 which may comprise bag assembly 102. Bag assembly 102 may comprise portable enclosure 105, convertible container 130, and user-holder 160. Portable enclosure 105 may comprise front wall 107, rear wall 109, first sidewall 111, second sidewall 113, top 115, top closure 117, bottom 119, and side-compartment 121. Convertible container 130 may comprise first-compartment 132, second-compartment 135, and snap-fit closure 138. Bag assembly 102 may comprise pet essentials bag with convertible holder and bowl system 100.

Portable enclosure 105, convertible container 130, and user-holder 160 may comprise in functional combination bag assembly 102. Front wall 107, rear wall 109, first sidewall 111, second sidewall 113, top 115, and bottom 119 may define portable enclosure 105. Portable enclosure 105 may further comprise inner volume 125. Top closure 117 may be structured and arranged to provide an unlockable closing between top 115 and front wall 107 of portable enclosure 105 for providing user 140 access to inner volume 125. Side-compartment 121 may be mountable adjacent to first sidewall 111, and side-compartment 121 may further be mountable adjacent to second sidewall 113.

Still referring to FIG. 1, user-holder 160 may be removably-attachable to portable enclosure 105, and may further be structured and arranged for enabling user 140 to carry bag assembly 102. Pet essentials bag with convertible holder and bowl system 100 may be useful for providing a compact carrier for carrying pet essentials, such as pet food and water, and for serving a pet food and water in first-compartment 132 and second-compartment 135 of convertible container 130, respectively. Convertible container 130 may further comprise insulator 410 for the water bottle. convertible container 130 may be structured and arranged to retain the water bottle, the water bottle able to hold 16 fluid ounces of liquid. First-compartment 132 and second-compartment 135 of convertible container 130 may comprise nonskid base 420 for securing first-compartment 132 comprising first-bowl 133 and second-compartment 135 comprising second-bowl 136 during 'in-use' condition 150 of pet essentials bag with convertible holder and bowl system 100.

In continuing to refer to FIG. 1, the unlockable closing of top closure 117 may comprise zipper 165. User-holder 160 may comprise shoulder strap 210 useful for carrying portable enclosure 105 via a shoulder of user 140. Shoulder strap 210 may comprise length-adjuster 215 for adjusting the length of shoulder strap 210. User-holder 160 may further comprise a handle useful for carrying portable enclosure 105 via a hand of user 140. Portable enclosure 105 may further comprise identification tag 220. Identification tag 220 may comprise transparent window 222 for displaying identification information pertaining to the pet of user 140. Top closure 117 may further comprise flap closure 225 for providing a redundant securer of portable enclosure 105. Side-compartment 121 and inner pocket 310 of portable enclosure 105 may further comprise snap-fastener 155 for providing redundant closing means. Front wall 107 of portable enclosure 105 may comprise display window 170 which may be useful for portraying displayable 175. Displayable 175 may comprise an image of a dog eating. Displayable 175 may further comprise an advertisement. Portable enclosure 105 may comprise a canvas material and alternatively a nylon material fabricated for 'washability'.

In still referring to FIG. 1, pet essentials bag with convertible holder and bowl system 100 may comprise bag assembly 102 comprising portable enclosure 105, convertible container 130, and shoulder strap 210. Portable enclosure 105 may comprise front wall 107, rear wall 109, first sidewall 111, second sidewall 113, top 115, top closure 117 which may comprise flap closure 225, bottom 119, and side-compartment 121. Convertible container 130 may comprise insulator 410, first-compartment 132 comprising nonskid base 420, second-compartment 135 comprising nonskid base 420, and snap-fit closure 138. Convertible container 130 may further comprise the hexagonal-cylindrical profile bifurcated into two halves, the two halves comprising first-compartment 132 and second-compartment 135, respectively, as shown.

In continuing to refer to FIG. 1, convertible container 130 may comprise a hollow confine structured and arranged to retain the water bottle when convertible container 130 may be in closed condition. First-compartment 132 may comprise first-bowl 133 when convertible container 130 may be in an open condition, and second-compartment 135 may comprise second-bowl 136 when convertible container 130 may be in open condition. User-holder 160 may comprise shoulder strap 210 which may comprise length-adjuster 215 for adjusting the length of shoulder strap 210. Shoulder strap 210 may be useful for carrying portable enclosure 105 via the shoulder of user 140.

Figure 2:
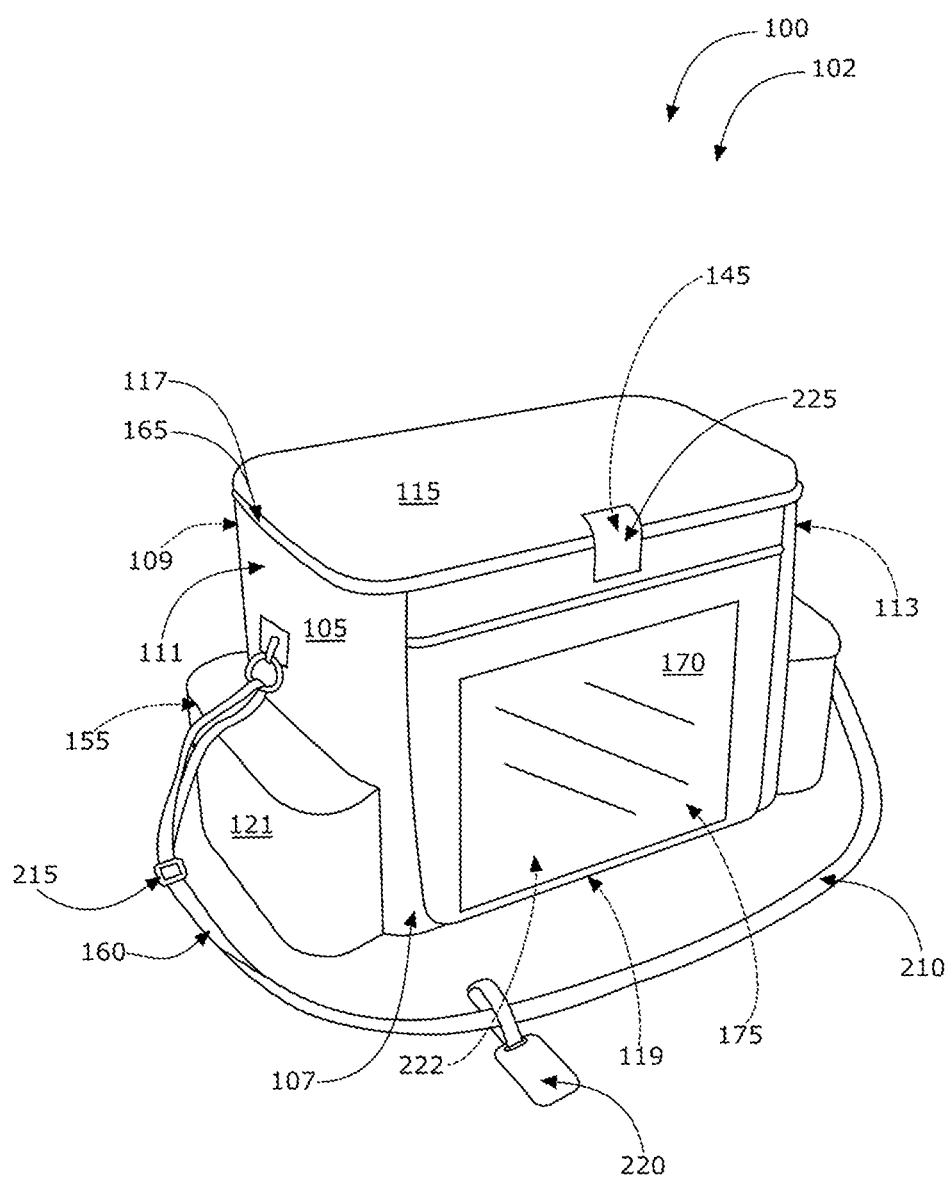
FIG. 2 is a perspective view illustrating a perspective view of a bag assembly comprising a portable enclosure in a closed-condition according to an embodiment of the present invention of FIG. 1.

Referring now to FIG. 2 showing a perspective view illustrating bag assembly 102 comprising portable enclosure 105 in a closed-condition according to an embodiment of the present invention of FIG. 1. Bag assembly 102 may comprise pet essentials bag with convertible holder and bowl system 100. Portable enclosure 105, convertible container 130, and user-holder 160 may comprise in functional combination bag assembly 102. Front wall 107, rear wall 109, first sidewall 111, second sidewall 113, top 115, and bottom 119 in combination may define portable enclosure 105. Portable enclosure 105 may comprise inner volume 125. Top closure 117 may be structured and arranged to provide an unlockable closing between top 115 and front wall 107 of portable enclosure 105 for providing user 140 access to inner volume 125. Side-compartment 121 may be mountable adjacent first sidewall 111, and side-compartment 121 may further be mountable adjacent second sidewall 113.

In continuing to refer to FIG. 2, portable enclosure 105 may further comprise identification tag 220, identification tag 220 may comprise transparent window 222 for displaying identification information pertaining to the pet of user 140. Portable enclosure 105 may further comprise inner pocket 310 useful for retaining the plurality of pet accessories. Side-compartment 121 and inner pocket 310 of portable enclosure 105 may further comprise snap-fastener 155. The front surface of front wall 107 of portable enclosure 105 may comprise display window 170, display window 170 useful for portraying displayable 175. User-holder 160 may be removably-attachable to portable enclosure 105, and user-holder 160 may further be structured and arranged for enabling user 140 to carry bag assembly 102. Pet essentials bag with convertible holder and bowl system 100 may be useful for providing a compact carrier for carrying pet essentials, such as pet food and water, and for serving the pet food and water in first-compartment 132 and second-compartment 135 of convertible container 130, respectively.

Figure 3:
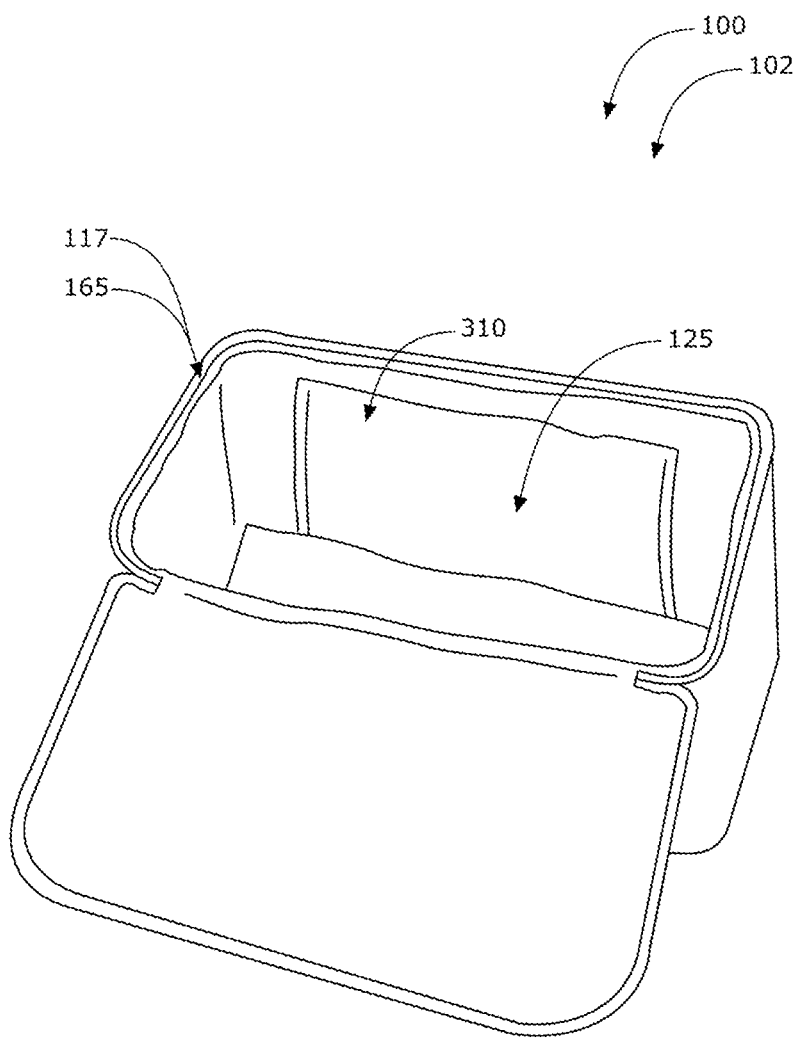
FIG. 3 is a perspective view illustrating a perspective view of a bag assembly comprising the portable enclosure in an open-condition according to an embodiment of the present invention of FIGS. 1 and 2.

Referring now to FIG. 3 is a perspective view illustrating bag assembly 102 comprising portable enclosure 105 in an open-condition according to an embodiment of the present invention of FIGS. 1 and 2. Portable enclosure 105 may further comprise inner pocket 310 useful for retaining a plurality of pet accessories. Inner pocket 310 may comprise a lockable and unlockable pocket retaining various pet accessories, as well as personal items belonging to user 140, in a more discrete and concealed manner.

Figure 4:
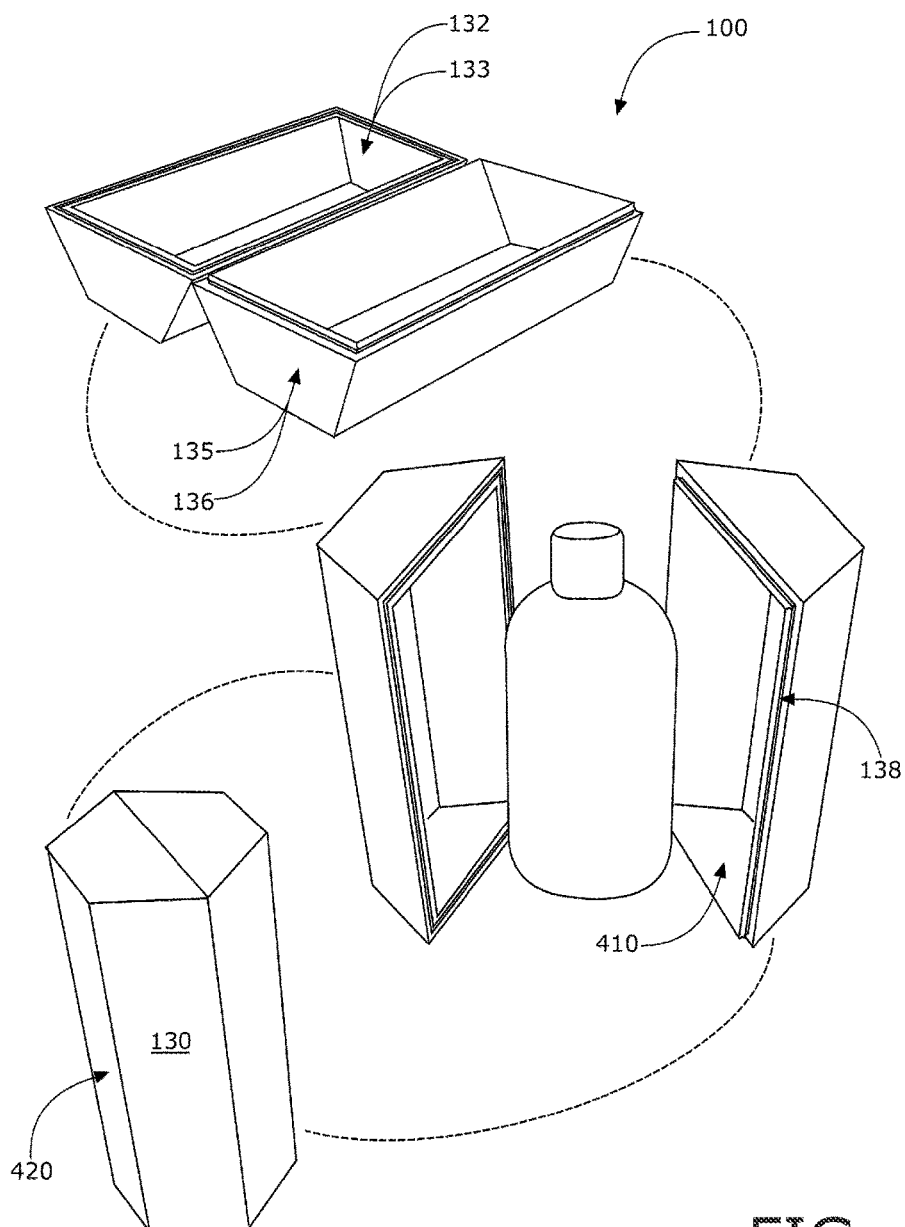
FIG. 4 perspective views illustrating a convertible container integrally comprising a first-bowl and a second-bowl according to an embodiment of the present invention of FIGS. 1-3.

Referring now to FIG. 4 perspective views of convertible container 130 integrally comprising first-bowl 133 and second-bowl 136 according to an embodiment of the present invention of FIGS. 1-3. Convertible container 130 may further comprise a hexagonal-cylindrical profile, the hexagonal-cylindrical profile bifurcated into two halves which may comprise first-compartment 132 and second-compartment 135 respectively. First-compartment 132 and second-compartment 135 may be connected via a hinge member, the hinge member may enable first-compartment 132 and second-compartment 135 to swing open and close. First-compartment 132 and second-compartment 135 may alternatively be removably-connectible via snap-fit closure 138. Snap-fit closure 138 may enable first-compartment 132 and second-compartment 135 to be coupled and uncoupled. Convertible container 130 may comprise a hollow confine structured and arranged to retain a water bottle when convertible container 130 is in a closed condition. First-compartment 132 may comprise first-bowl 133 when convertible container 130 is in an open condition, and second-compartment 135 may comprise second-bowl 136 when convertible container 130 is in an open condition.

Pet essentials bag with convertible holder and bowl system 100 may comprise a kit. The kit may comprise the following parts: bag assembly 102 (which may comprise portable enclosure 105, convertible container 130, and user-holder 160), at least one water bottle, and a set of user instructions. The kit has instructions such that functional relationships are detailed in relation to the structure of the invention (such that the invention can be used, maintained, or the like in a preferred manner).

Pet essentials bag with convertible holder and bowl system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different container combinations, parts may be sold separately, etc., may be sufficient.

Figure 5:
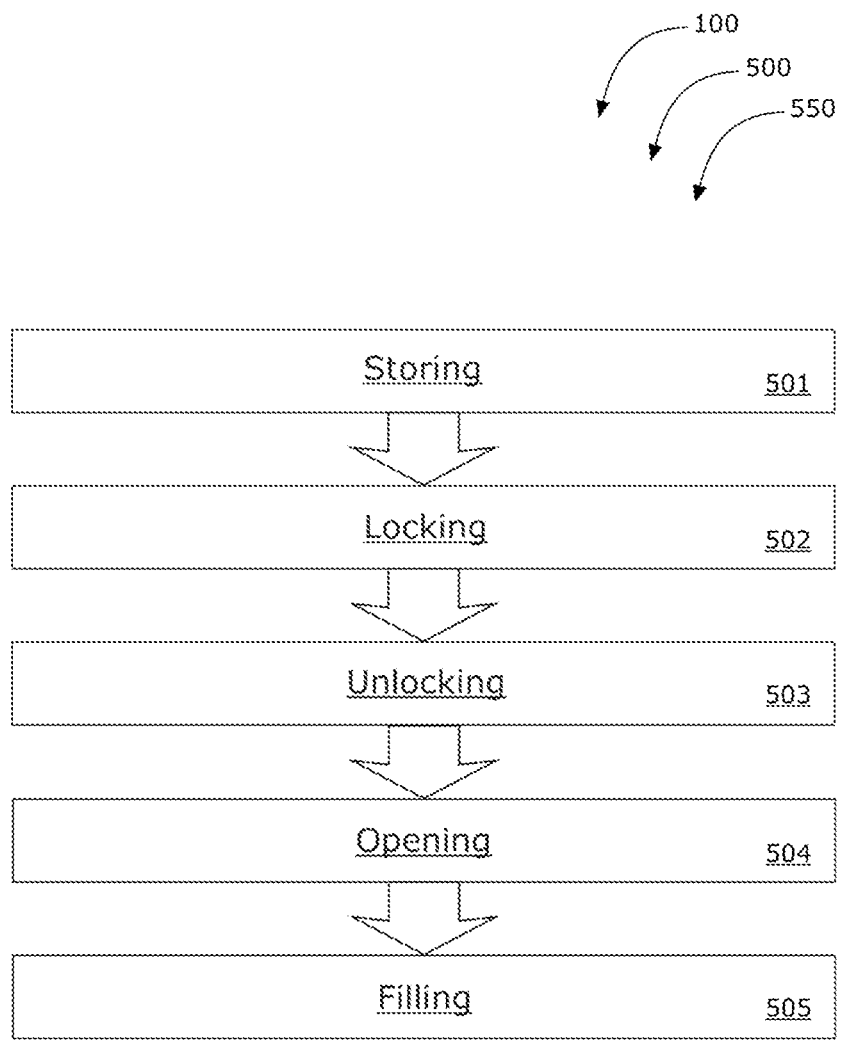
FIG. 5 is a flowchart illustrating a method of use for the pet essentials bag with convertible holder and bowl system according to an embodiment of the present invention of FIGS. 1-4.

Referring now to FIG. 5 showing flowchart 550 illustrating method of use 500 for pet essentials bag with convertible holder and bowl system 100 according to an embodiment of the present invention of FIGS. 1-4.

Method of use 500 may comprise the steps of: step one 501, storing a plurality of pet accessories inside portable enclosure 105 of bag assembly 102; step two 502, locking side-compartment 121 of portable enclosure 105 during transport of bag assembly 102; step three 503, unlocking side-compartment 121 of portable enclosure 105 during 'in-use' condition 150; opening convertible container 130 retaining at least one water bottle; and filling first-compartment 132 and second-compartment 135 with water and food for a pet to drink and eat out of.

It should be noted that the steps described in the method of use can be carried out in many different orders according to user preference. The use of "step of" should not be interpreted as "step for", in the claims herein and is not intended to invoke the provisions of 35 U.S.C. § 112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A pet essentials bag comprising:
a bag assembly comprising;
a portable enclosure comprising;
a front wall;
a rear wall;
a first sidewall;
a second sidewall;
a top;
a top closure;
a bottom; and
at least one side-compartment;
a convertible container comprising;
a first-compartment;
a second-compartment; and
a snap-fit closure;
at least one water bottle;
wherein said at least one water bottle is removably stored within said convertible container and adapted to retain water therein and allow water to be poured therefrom; and
a user-holder;
wherein said portable enclosure, said convertible container, said at least one water bottle, and said user-holder comprises in functional combination said bag assembly;
wherein said front wall, said rear wall, said first sidewall, said second sidewall, said top, and said bottom, defines said portable enclosure;
wherein said portable enclosure comprises an inner volume;
wherein said top closure is structured and arranged to provide an unlockable closing between said top and said front wall of said portable enclosure for providing user access to said inner volume;
wherein said at least one side-compartment is mountable adjacent said first sidewall;
wherein said at least one side-compartment is mountable adjacent said second sidewall;
wherein said convertible container comprises a hexagonal-cylindrical profile, said hexagonal-cylindrical profile bifurcoated into two halves, said two halves comprising said first-compartment and said second-compartment respectively;
wherein said first-compartment and said second-compartment are removably-connectible via said snap-fit closure, said snap-fit closure enabling said first-compartment and said second-compartment to be coupled and uncoupled;
wherein said convertible container comprises a hollow confine structured and arranged to retain said at least one water bottle when said convertible container is in a closed condition;
wherein said first-compartment forms a first-bowl when said convertible container is in an open condition; and wherein said first-bowl is adapted to be used to retain water poured therein from said at least one water bottle, such that a pet can drink water from said first-bowl;
wherein said second-compartment forms a second-bowl when said convertible container is in said open condition; and wherein said first-bowl is adapted to be used to retain water poured therein from said at least one water bottle, such that a pet can drink water from said second-bowl;
wherein said user-holder is removably-attachable to said portable enclosure, said user-holder structured and arranged for enabling a user to carry said bag assembly; and
wherein said pet essentials bag with convertible holder and bowl system is useful for providing a compact carrier for carrying pet essentials, such as pet food and water, and for serving said pet food and said water in said first-compartment and said second-compartment of said convertible container respectively.

2. The pet essentials bag of claim 1 wherein said convertible container further comprises an insulator for said at least one water bottle.

3. The pet essentials bag of claim 2 wherein said convertible container is structured and arranged to retain said at least one water bottle, said at least one water bottle able to hold about 16 fluid ounces of liquid.

4. The pet essentials bag of claim 3 wherein said first-compartment and said second-compartment of said convertible container comprises at least one nonskid base for securing said first-compartment comprising said first-bowl and said second-compartment comprising said second-bowl during an in-use condition of said pet essentials bag with convertible holder and bowl system.

5. The pet essentials bag of claim 4 wherein said unlockable closing of said top closure comprises a zipper.

6. The pet essentials bag of claim 5 wherein said user-holder comprises a shoulder strap useful for carrying said portable enclosure via a shoulder of said user.

7. The pet essentials bag of claim 6 wherein said shoulder strap comprises a length-adjuster for adjusting a length of said shoulder strap.

8. The pet essentials bag of claim 7 wherein said user-holder further comprises a handle useful for carrying said portable enclosure via a hand of said user.

9. The pet essentials bag of claim 8 wherein said portable enclosure further comprises an identification tag.

10. The pet essentials bag of claim 9 wherein said identification tag comprises a transparent window for displaying identification information pertaining to a pet of said user.

11. The pet essentials bag of claim 10 wherein said top closure further comprises a flap closure for providing a redundant securer of said portable enclosure.

12. The pet essentials bag of claim 11 wherein said portable enclosure further comprises an inner pocket useful for retaining a plurality of pet accessories.

13. The pet essentials bag of claim 12 wherein said at least one side-compartment and said inner pocket of said portable enclosure further comprises a snap-fastener for providing a redundant closing means.

14. The pet essentials bag of claim 13 wherein said front wall of said portable enclosure comprises a display window useful for portraying a displayable.

15. The pet essentials bag of claim 14 wherein said displayable comprises an image of a dog eating.

16. The pet essentials bag of claim 14 wherein said displayable comprises an advertisement.

17. The pet essentials bag of claim 14 wherein said portable enclosure comprises canvas and alternatively nylon fabricated for washability.

* * * * *